(12) United States Patent
Kitayama et al.

(10) Patent No.: US 8,376,449 B2
(45) Date of Patent: Feb. 19, 2013

(54) SPOILER FOR REAR HATCH CLOSURE ASSEMBLY

(75) Inventors: Kenichi Kitayama, Tochigi (JP); Michael A Schrader, Plain City, OH (US); Matthew Weyand Schmitt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 263 days.

(21) Appl. No.: 12/851,897

(22) Filed: Aug. 6, 2010

(65) Prior Publication Data
US 2012/0032474 A1 Feb. 9, 2012

(51) Int. Cl.
B62D 25/10 (2006.01)
B62D 35/00 (2006.01)
E05B 65/19 (2006.01)

(52) U.S. Cl. ............ 296/180.1; 296/56; 296/146.8

(58) Field of Classification Search ......... 296/180.1, 296/180.5, 50, 56, 57.1, 146.8, 216.02, 216.05, 296/224
See application file for complete search history.

(56) References Cited

U.S. PATENT DOCUMENTS

| | | | |
|---|---|---|---|
| 1,889,679 A | 11/1932 | Marin | |
| 2,086,091 A | 7/1937 | Payette | |
| 2,596,355 A | 5/1952 | Ackermans | |
| 2,997,336 A | 8/1961 | Huggins et al. | |
| 3,214,213 A | 10/1965 | Helzer, Jr. et al. | |
| 3,378,298 A | 4/1968 | Wingen | |
| 3,419,304 A | 12/1968 | Sangimino | |
| 4,174,863 A * | 11/1979 | Gotz | 296/180.5 |
| 4,272,121 A * | 6/1981 | Kim | 296/216.05 |
| 4,274,670 A | 6/1981 | Pitzmann | |
| 4,323,274 A * | 4/1982 | Soderberg et al. | 296/180.1 |
| 4,477,115 A * | 10/1984 | Asakura et al. | 296/180.1 |
| 4,620,743 A | 11/1986 | Eke | |
| 4,659,136 A | 4/1987 | Martin et al. | |
| 4,707,014 A | 11/1987 | Rich | |
| 4,712,827 A | 12/1987 | Jensen | |
| 4,883,307 A * | 11/1989 | Hacker et al. | 296/180.2 |
| 5,035,462 A * | 7/1991 | Page et al. | 296/183.1 |
| 5,172,954 A * | 12/1992 | Yamazaki et al. | 296/180.1 |
| 5,183,310 A | 2/1993 | Shaughnessy | |
| 5,249,836 A * | 10/1993 | Stanesic et al. | 296/180.1 |

(Continued)

FOREIGN PATENT DOCUMENTS
DE 19513520 8/1996
JP 62210124 9/1987

(Continued)

OTHER PUBLICATIONS

Motorsnaps.com, http://www.motorsnaps.com/d/28353-3/2002+Webasto++Welcome.jpg.

(Continued)

*Primary Examiner* — Glenn Dayoan
*Assistant Examiner* — Gregory Blankenship
(74) *Attorney, Agent, or Firm* — Rankin Hill & Clark LLP (57) ABSTRACT

A spoiler assembly for a rear hatch closure assembly on a vehicle includes a base member extending laterally across the hatch closure assembly, a latch mounted to the base member, and a shell member secured to the base member to cover and conceal the latch.

19 Claims, 10 Drawing Sheets

U.S. PATENT DOCUMENTS

| | | | |
|---|---|---|---|
| 5,294,170 A | 3/1994 | Hsueh | |
| 5,556,152 A * | 9/1996 | Dunlap et al. | 296/57.1 |
| 5,921,611 A * | 7/1999 | Townsend | 296/155 |
| 5,997,072 A | 12/1999 | Parkinson | |
| 6,007,139 A | 12/1999 | Shave | |
| 6,193,302 B1 * | 2/2001 | Won et al. | 296/180.1 |
| 6,241,302 B1 | 6/2001 | Rehkopf | |
| 6,305,740 B1 | 10/2001 | Staser et al. | |
| 6,447,050 B1 | 9/2002 | Plassmeyer et al. | |
| 6,485,094 B2 | 11/2002 | Corder et al. | |
| 6,494,528 B2 | 12/2002 | Tolinski et al. | |
| 6,505,878 B1 | 1/2003 | Mascolo | |
| 6,637,806 B2 * | 10/2003 | Kazama | 296/180.1 |
| 6,695,377 B2 | 2/2004 | Paiva et al. | |
| 6,789,830 B2 | 9/2004 | Van Bussel | |
| 6,803,398 B1 * | 10/2004 | Ito et al. | 524/114 |
| 6,874,838 B2 | 4/2005 | De Gaillard | |
| 7,029,058 B2 | 4/2006 | Mathew | |
| 7,032,962 B2 | 4/2006 | Engelgau et al. | |
| 7,140,657 B2 | 11/2006 | Cuma | |
| 7,334,833 B2 | 2/2008 | Koelbl et al. | |
| 7,354,095 B2 | 4/2008 | Fleming et al. | |
| 7,438,342 B2 | 10/2008 | Greenwood | |
| 7,490,891 B2 * | 2/2009 | Terakawa et al. | 296/180.1 |
| 7,494,175 B2 | 2/2009 | Condon et al. | |
| 7,651,148 B2 | 1/2010 | Hustyi et al. | |
| 8,152,230 B2 * | 4/2012 | Kitayama et al. | 296/220.01 |
| 8,167,357 B2 * | 5/2012 | Kitayama et al. | 296/146.8 |
| 2005/0093324 A1 * | 5/2005 | Bruford et al. | 296/57.1 |
| 2005/0253406 A1 | 11/2005 | Faubert et al. | |
| 2007/0063541 A1 * | 3/2007 | Browne et al. | 296/180.1 |
| 2008/0315632 A1 | 12/2008 | Righetti | |
| 2010/0032982 A1 * | 2/2010 | Browne et al. | 296/180.5 |
| 2012/0032474 A1 * | 2/2012 | Kitayama et al. | 296/180.1 |

FOREIGN PATENT DOCUMENTS

JP     1289773     11/1989

OTHER PUBLICATIONS

Citroen C3 Pluriel—photographs 1 and 2.
Renault Be-Bop—photographs 1 and 2.
GMC Envoy XUV—photograph 1.
Webasto Welcome Concept—photograph 1.
Studebaker Wagonaire—photograph 1.

* cited by examiner

SPOILER FOR REAR HATCH CLOSURE ASSEMBLY

BACKGROUND

The present disclosure generally relates to vehicles, and more particularly relates to a spoiler for a rear hatch closure assembly on a vehicle.

Vehicle design is often focused on providing increased and/or improved cargo carrying capabilities for vehicles. This is particularly important for smaller, compact vehicles where there is often limited space available to dedicate to carrying cargo. Many smaller vehicles incorporate a flip-up hatch closure on the rear of the vehicle for providing access into the rear of the vehicle. Some hatch closures include a lower hatch closure that flips down and an upper hatch closure that flips up. Whether the entire hatch closure or only an upper hatch closure flips-up, these designs are often limited in that the vehicle is not designed to be driven with the hatch closures in the flipped-up positions.

Several known vehicles are configured in an attempt to provide improved cargo carrying capabilities for the vehicle. One such vehicle is the 2004 Citroen C3 Pluriel. This vehicle has a retractable soft top with a pivotable closure provided in a rear portion of the soft top facing a rear of the vehicle, and also has a drop-down tailgate disposed below the pivotable closure in the rear of the vehicle. The pivotable closure can be pivoted upward and the tailgate pivoted downward to provide a large cargo opening into the rear of the vehicle. Drawbacks of this arrangement relate to the use of a soft top and range from undesirable road noise entering the vehicle to insufficient durability to limited theft prevention.

Another known vehicle is the Renault Be-Bop concept vehicle shown at the 2003 Frankfurt Motor Show. This vehicle has a rear tailgate and an adjacent sliding roof panel. The tailgate has a vertically retractable window and is configured as a swing-out tailgate (i.e., the tailgate is pivoted open about a vertical axis). The sliding roof panel is movable to a slide open position forward along the vehicle's roof. When the tailgate is in the swing-open position and the roof panel is slid open, a large cargo opening is provided (i.e., the cargo opening includes the opening normally closed by the tailgate combined with the opening normally closed by the sliding roof panel. Drawbacks associated with this vehicle include its boxy and truck-like appearance and its use of exterior tracks for the sliding roof panel, which exposes the tracks to environmental elements and contributes to an overall unsightly appearance. Another similar vehicle is the 2003-2004 GMC Envoy XUV, but this vehicle uses a powered sliding roof panel, which significantly increases costs of the vehicle.

Still another known vehicle is the Webasto Welcome concept vehicle shown in or about 2002. This vehicle has a drop-down tailgate and an adjacent sliding roof panel. The tailgate and the roof panel can both be moved to their respective open positions for providing a combined rear cargo opening. Drawbacks of this vehicle include a boxy rear end and a relatively small sized cargo opening. Also, this sliding hatch is not optimally designed for driving while in the open position.

An older example vehicle with a similar combined rear cargo opening is the 1963 Studebaker Wagoneer. This vehicle is believed to be one of the first mass produced vehicles to offer a transforming rear cargo area. It includes a tailgate having a rear window that slides or retracts down into the tailgate body and a sliding roof panel disposed adjacent the tailgate. Drawbacks associated with this vehicle include severe water leak issues and the use of the inconvenient sliding rear window.

One issue faced by vehicle designers of these types of vehicles is where to provide the hardware for the closures and/or sliding roof panels. This often involves balancing the competing interests of functionality and vehicle aesthetics. There can also be spatial constraints (e.g., limited space available for latches and actuators) and durability considerations.

SUMMARY

According to one aspect, a spoiler assembly for a rear hatch closure assembly on a vehicle includes a base member extending laterally across the hatch closure assembly, a latch mounted to the base member, and a shell member secured to the base member to cover and conceal the latch.

According to another aspect, a spoiler assembly for a vehicle includes a base member extending laterally across a hatch closure, a pair of latch members disposed at opposite ends of the base member for latching the hatch closure in a closed position and a shell member mounted over the pair of latch members onto the base member.

According to a further aspect, a spoiler assembly for a sliding hatch closure includes a base member, a latch mounted to the base member and a shell member mounted to the base member over the latch for concealing the latch.

DETAILED DESCRIPTION

Figure 1:
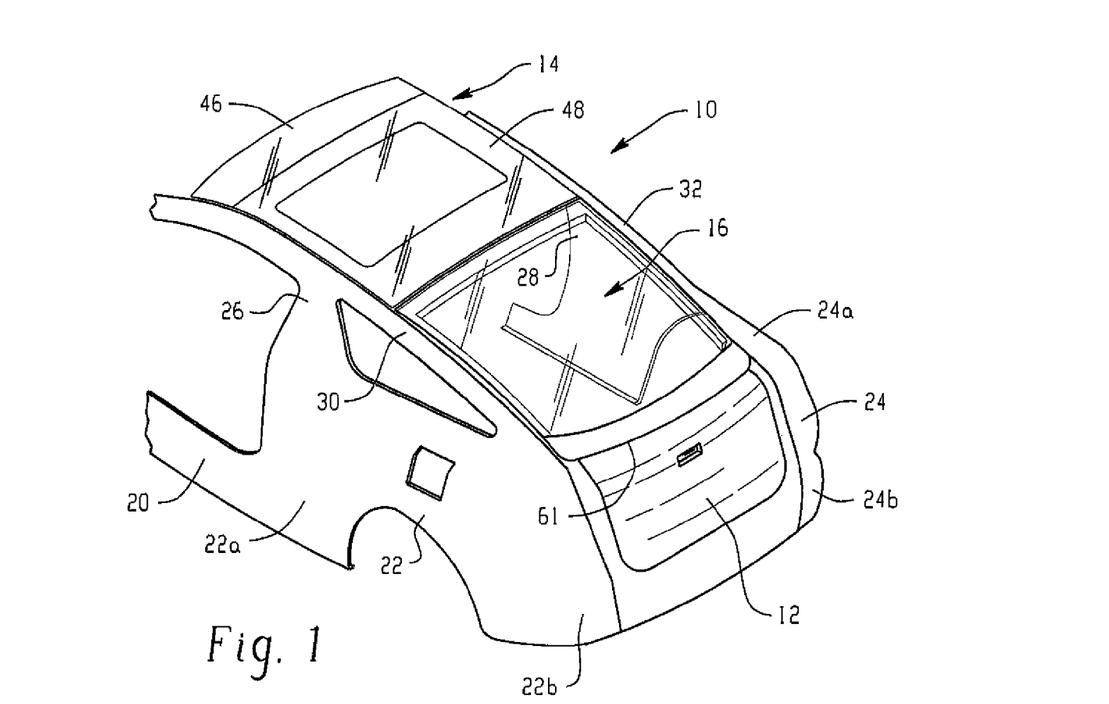
FIG. 1 is a schematic perspective view of a vehicle having a first closure slidably mounted to a vehicle body and a second closure pivotally mounted to the first closure, both closures shown in respective closed positions.
Figure 2:
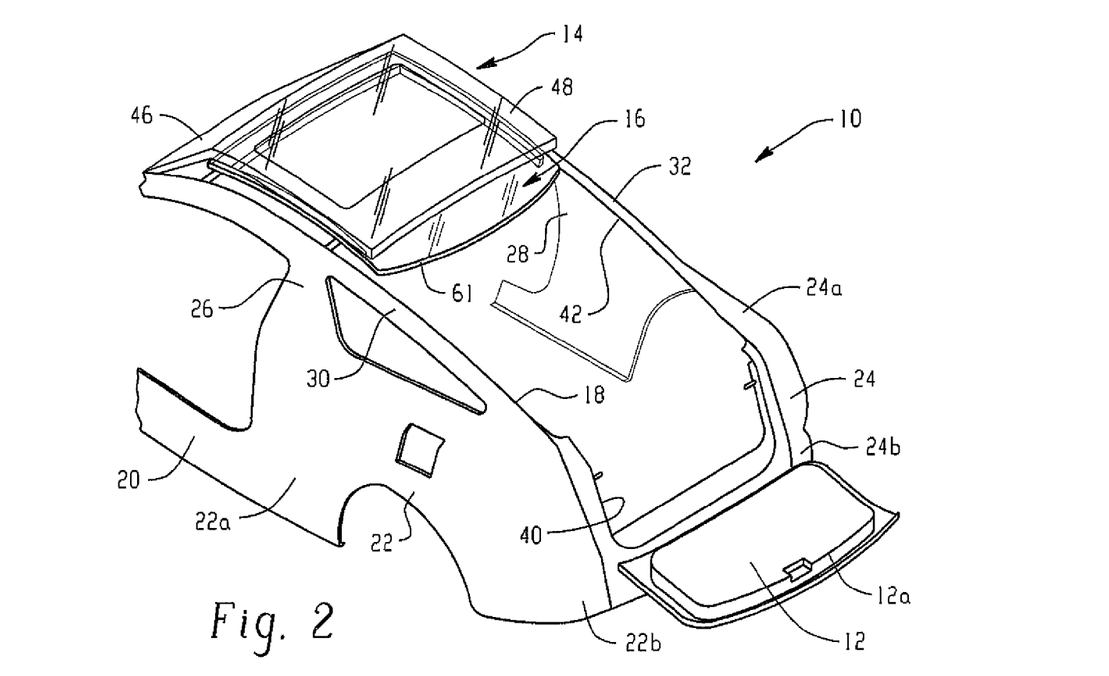
FIG. 2 is a schematic perspective view of the vehicle of FIG. 1 shown with the first closure in a slide open position and a tailgate disposed therebelow in an open position.

Referring now to the drawings wherein the showings are for purposes of illustrating one or more exemplary embodiments and not for purposes of limiting same, FIG. 1 illustrates a vehicle 10 having a tailgate 12, a panoramic roof assembly 14 and a dual-action rear hatch 16, also referred to herein as a rear closure assembly and/or a slide hatch assembly. As shown, the vehicle 10 can be a coupe-type vehicle and/or a hatchback vehicle, such as the type having a rear cargo opening 18 (FIG. 2). More particularly, the vehicle 10 has a vehicle body 20 that defines the cargo opening 18 between a pair of laterally spaced apart rear quarter panels or panel members 22, 24. As shown, the rear quarter panels 22, 24 have side portions 22a, 24a and rear corner portions 22b, 24b. The rear corner portions 22b, 24b define a rear portion of the vehicle body 20 in the illustrated embodiment.

The side portions 22a, 24a of the rear quarter panels 22, 24 include roof support members, including forward roof support members 26, 28 and rearward roof support members 30, 32. The forward roof support members 26, 28 can be the C-pillars of the vehicle body 20 and the rearward roof support members can be roof rails extending between the C-pillars and the rear corner portions 22b, 24b. More specifically, in the illustrated embodiment, the rearward roof support members 30, 32 are angularly oriented roof rails 30, 32 that have lower ends connected to the corner portions 22b, 24b and upper ends connected to the upper ends of the C-pillars 26, 28. The roof rails 30, 32 extend upward from the rear corner portions 22b 24b and thus extend from the rear portion of the vehicle body 20 defined by the rear corner portions 22b, 24b. As illustrated, the sliding hatch 16 extends laterally between rear quarter panels 22, 24 of the vehicle body 20 and extends longitudinally from the C-pillars 26, 28 of the vehicle body 20 to an upper edge 12a of the tailgate 12 of the vehicle. In the illustrated embodiment, the sliding hatch 16 extends downward at an angle from the C-pillars 26, 28 to the upper edge 12a of the tailgate 12.

With additional reference to FIG. 2, the rear cargo opening 18 has a rearward portion 40 and a forward portion 42. The forward portion 42 is contiguous with the rearward portion 40 to form the opening 18 as a relatively large opening in the vehicle body 20 on the vehicle 10. The rear quarter panels 22, 24 define lateral sides of the rear cargo opening 18, including lateral sides of each of the rearward portion 40 and the forward portion 42. In particular, the forward portion 42 of the cargo opening 18 is defined between the roof support members 30, 32 above the rear corner portions 22b, 24b. The rear or rearward portion 42 of the cargo opening 18 is defined between the rear corner portions 22b, 24b below the lower ends of the rear roof support members 30, 32. Accordingly, the rear roof support members 30, 32 define lateral sides of the forward portion 40 of the cargo opening 18 and the rear corner portions 22b, 24b define lateral sides of the rearward portion 42 of the cargo opening 18 at the rear of the vehicle 10.

Figure 3:
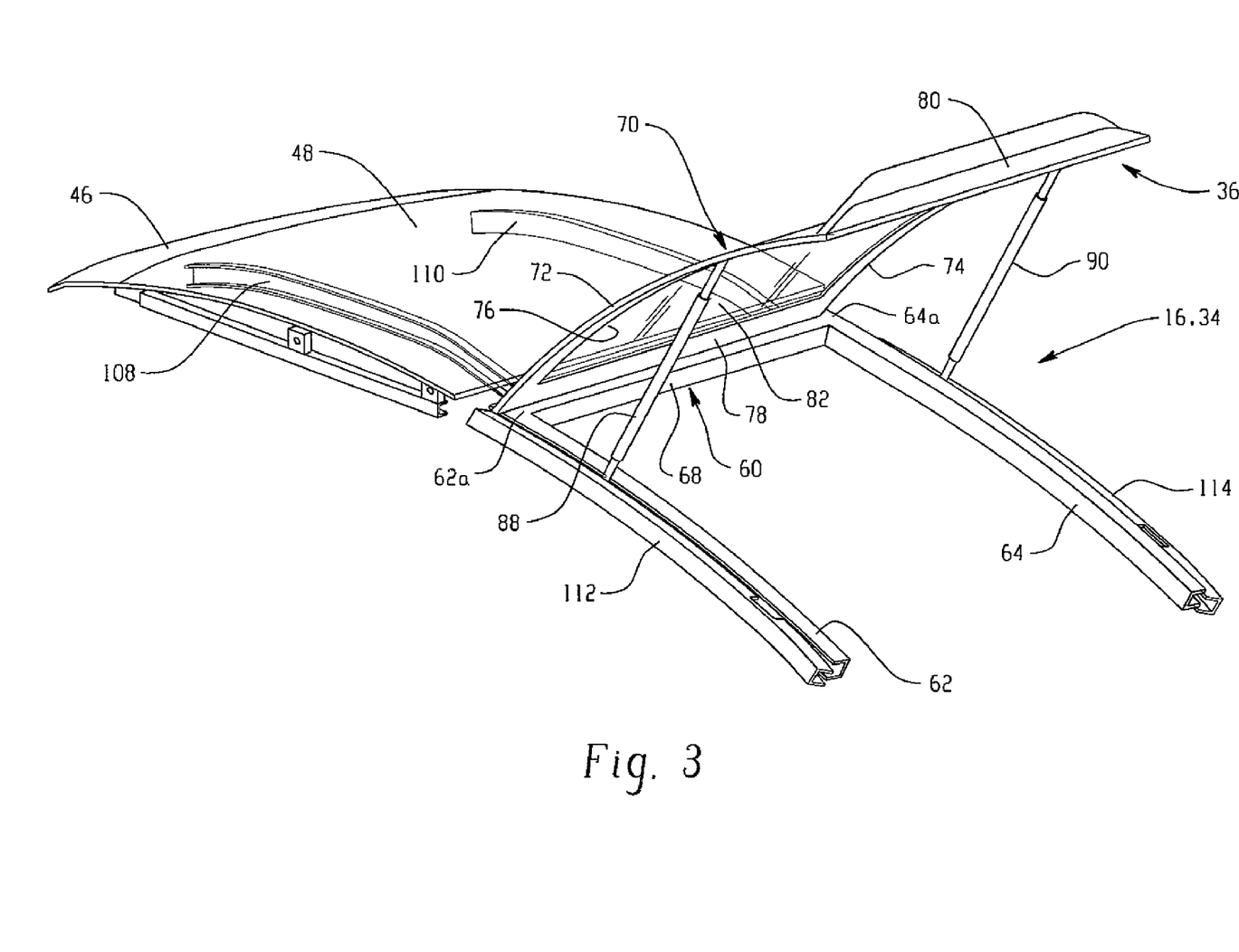
FIG. 3 is partial schematic perspective view of the vehicle of FIG. 1 showing the second closure in a pivot open position.
Figure 4:
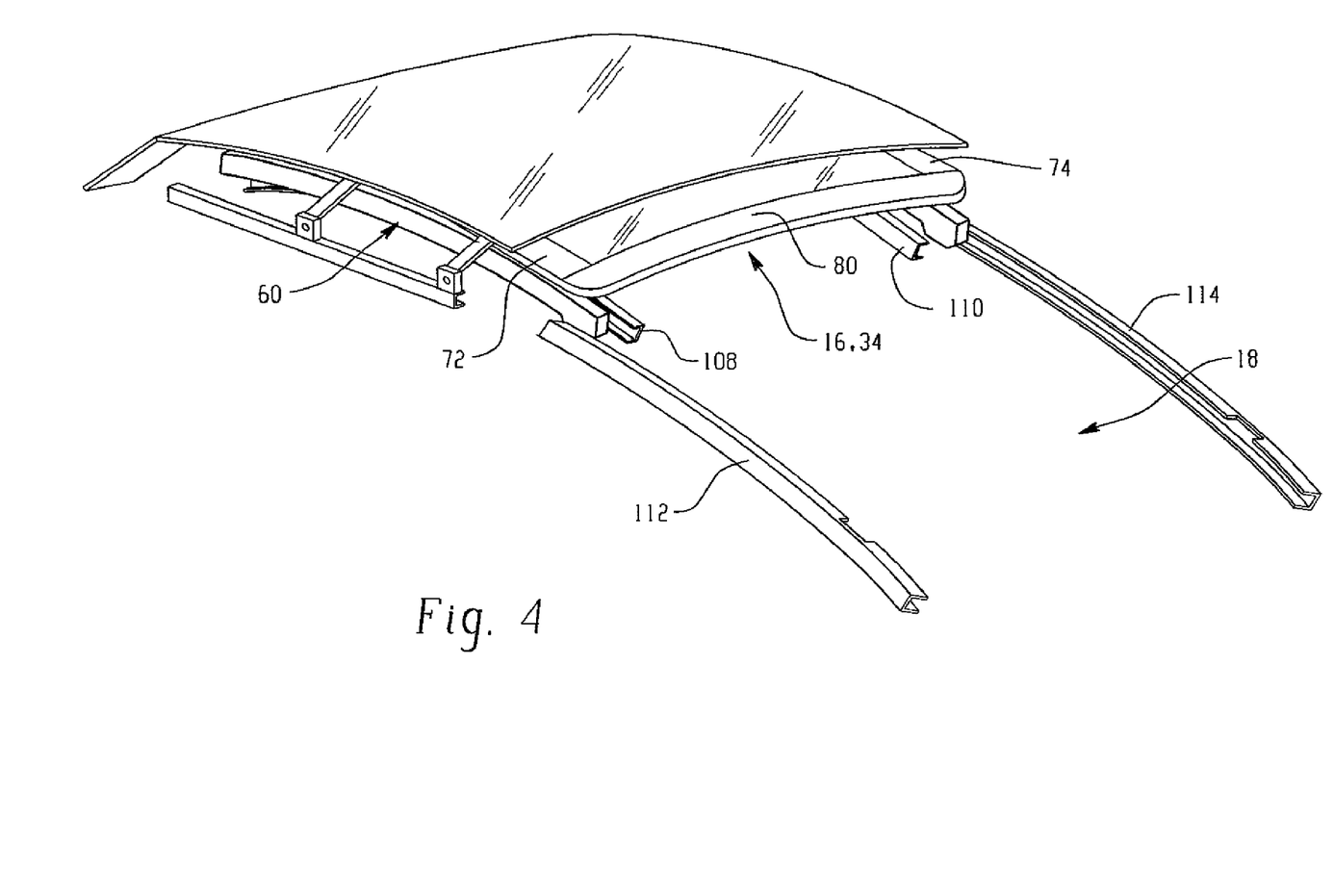
FIG. 4 is a partial schematic perspective view of the vehicle of FIG. 1 showing the first closure in a slide open position.

With additional reference to FIGS. 3-4, the rear closure assembly 16 includes a first closure 34 slidably mounted to the vehicle body 20 of the vehicle 10 for movement between a slide closed position (FIG. 1) and a slide open position (FIG. 4). The closure assembly 16, and particularly the first closure 34 thereof, further includes a second closure 36 pivotally mounted to the first closure 34 for movement between a pivot closed position (FIG. 1) and a pivot open position (FIG. 2). By this arrangement, the rear closure assembly 16 can selectively close the rear cargo opening 18. More particularly, the first closure 34 is a sliding hatch that is slidably mounted to the vehicle body 20 and the second closure 36 is a hatch closure pivotally mounted to the sliding hatch 16.

In the illustrated embodiment, the roof assembly 14 is a dual-panel assembly including a forward panel 46 and a rearward panel 48 hingedly connected to the forward panel 46 along adjacent edges of the panels 46, 48. The roof assembly 14, including the panels 46, 48, is disposed forward of the closure assembly 16 on the vehicle body 20. At least the rearward panel 48 is movable to one or more of raised positions for accommodating the closure assembly 16 below the roof panel 48 when moved to the slide open position. The hatch 16 can have a sliding mode wherein the hatch 16 slidably movable from the closed position shown in FIG. 1 to a slide forward or open position shown in FIGS. 2 and 4. In the slide open position, the rear hatch 16 is received under the roof assembly 14 with the roof assembly 14 in one of its raised positions. The hatch 16 can also have a flip-open mode wherein the rear hatch 16, and particularly the second closure 36, is flipped-open as shown in FIG. 3 while the rear hatch 16 remains in the slide closed position. This also provides access through the forward portion 42.

Figure 5:
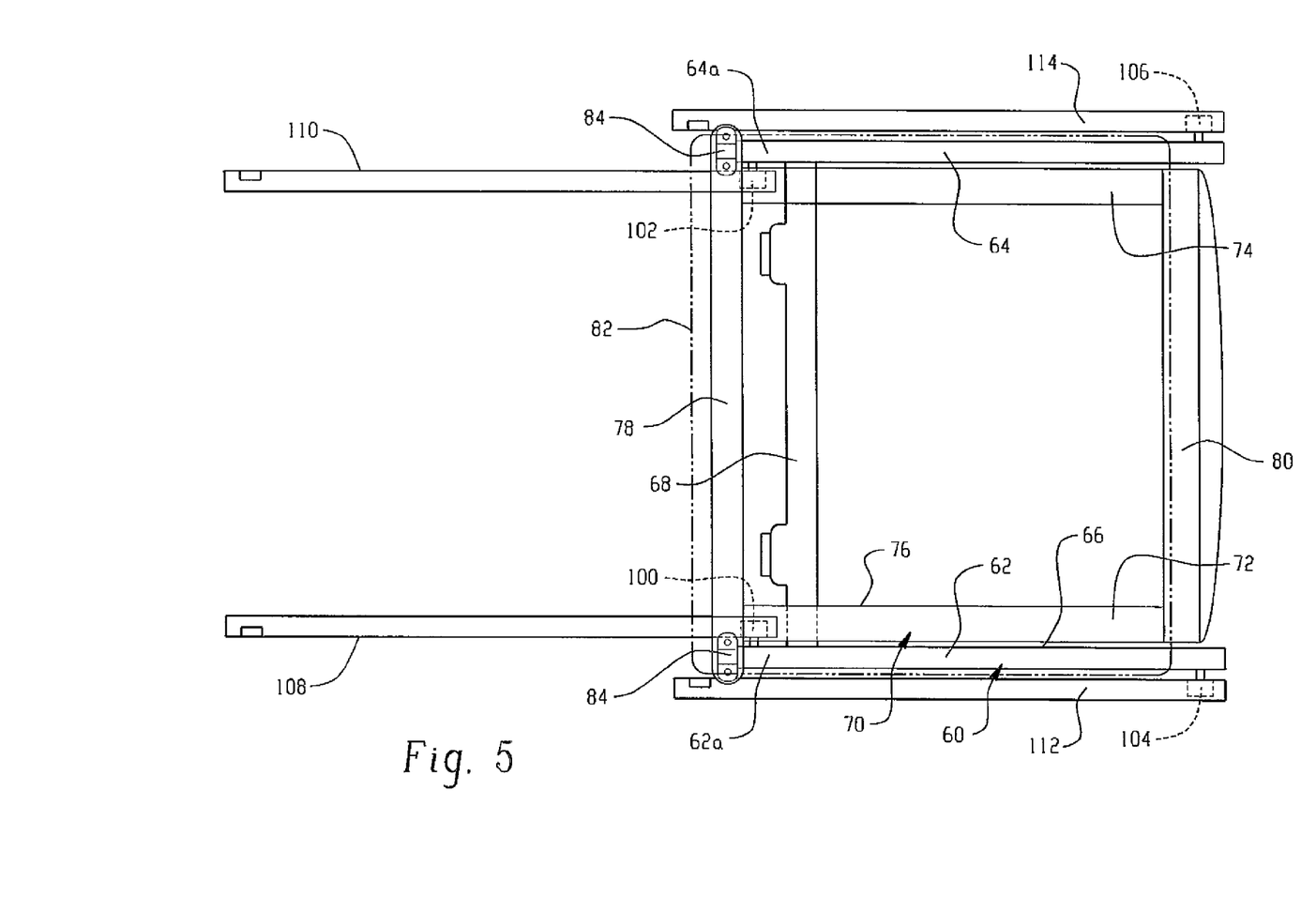
FIG. 5 is a partial schematic plan view showing the first closure slidably mounted to front and rear rails, which are themselves mounted to the vehicle body.

With further reference to FIG. 5, the sliding hatch 16 includes a hatch frame 60 slidably mounted to the vehicle body 20 and the hatch closure 36 pivotally mounted to the hatch frame 60. The hatch frame 60 slidably moves between the slide closed position and the slide open position, whereas the hatch closure 36 pivotally moves between the pivot closed position and the pivot open position. The hatch frame 60 of the illustrated embodiment includes spaced apart lateral side frame members 62, 64 defining a hatch opening 66 therebetween, the hatch opening 66 being a portion of the rear cargo opening 18. The side frame members 62, 64 extend along and adjacent the rear quarter panels 22, 24. The hatch frame 60 further includes an upper cross member 68 extending laterally between upper ends 62a, 64a of the lateral side frame members 62, 64. By this arrangement, the hatch frame 60 has a generally inverted U-shape formed by the lateral side frame members 62, 64 and the upper cross member 68 with an open end disposed rearwardly on the vehicle body 20.

As mentioned, the hatch closure 36 is pivotally mounted to the sliding hatch 16 for movement between the pivot closed position and the pivot open position, particularly when the hatch frame 60 is in the slide closed position. In particular, the hatch closure 36 is mounted to the lateral side frame members 62, 64 and closes the hatch opening 66 defined therebetween when in the pivot closed position. The hatch closure 36 includes a hatch closure or flip frame 70 having a pair of laterally spaced apart lateral side members 72, 74 defining a window opening 76 therebetween. The flip frame 70 further includes spaced apart cross members 78, 80 extending laterally between the lateral side members 72, 74 to further define the window opening 76. A window panel 82 spans across the window opening 76 and is supported by the side members 72, 74 and the cross members 78, 80.

The hatch closure 36, and particularly the flip frame 70, is pivotally mounted to the sliding hatch 16 by hinges 84 (only one shown in FIG. 4) disposed adjacent the upper ends 62a, 64a of the side frame members 24, 26. In particular, spaced apart hinges 84 pivotally mount the hatch closure 36 to the upper ends 62a, 64a of the lateral side frame members 72, 74. This allows the hatch closure 36, and particularly its hatch frame 70, to pivot from the pivot closed position of FIG. 1 to the pivot open position of FIG. 2. As shown, dampers 88, 90 can respectively mount the side members 72, 74 of the pivot hatch 36 to the lateral side members 62, 64 of the slide frame 60.

For slidably mounting the sliding hatch 16 onto the vehicle body 20, the sliding hatch 16 includes rollers 100, 102, 104, 106 movably mounted within corresponding tracks 108, 110, 112, 114 mounted to the vehicle body 20. In particular, the hatch frame 60 includes the rollers 100-106 connected thereto that slidably move the hatch frame 60 along the tracks 108-114 mounted to the vehicle body 20. The tracks 108-114 include a set of front tracks 108, 110 that are laterally spaced apart forward of the rear cargo opening 18 and a set of rear tracks 112, 114 laterally spaced apart and flanking the rear opening 18. The rollers 100-106 include front rollers 100, 102 mounted on a forward portion of the hatch frame 60 (i.e., adjacent the upper ends 62a, 64a) and received in the front tracks 108, 110 and rear rollers 104, 106 mounted to a rear portion of the hatch frame 60 and received in the rear tracks 112, 114. The rollers 100-106 roll along their respective tracks 108-114 to allow the sliding hatch 16 to slidably move relative to the vehicle body 20.

Figure 6:
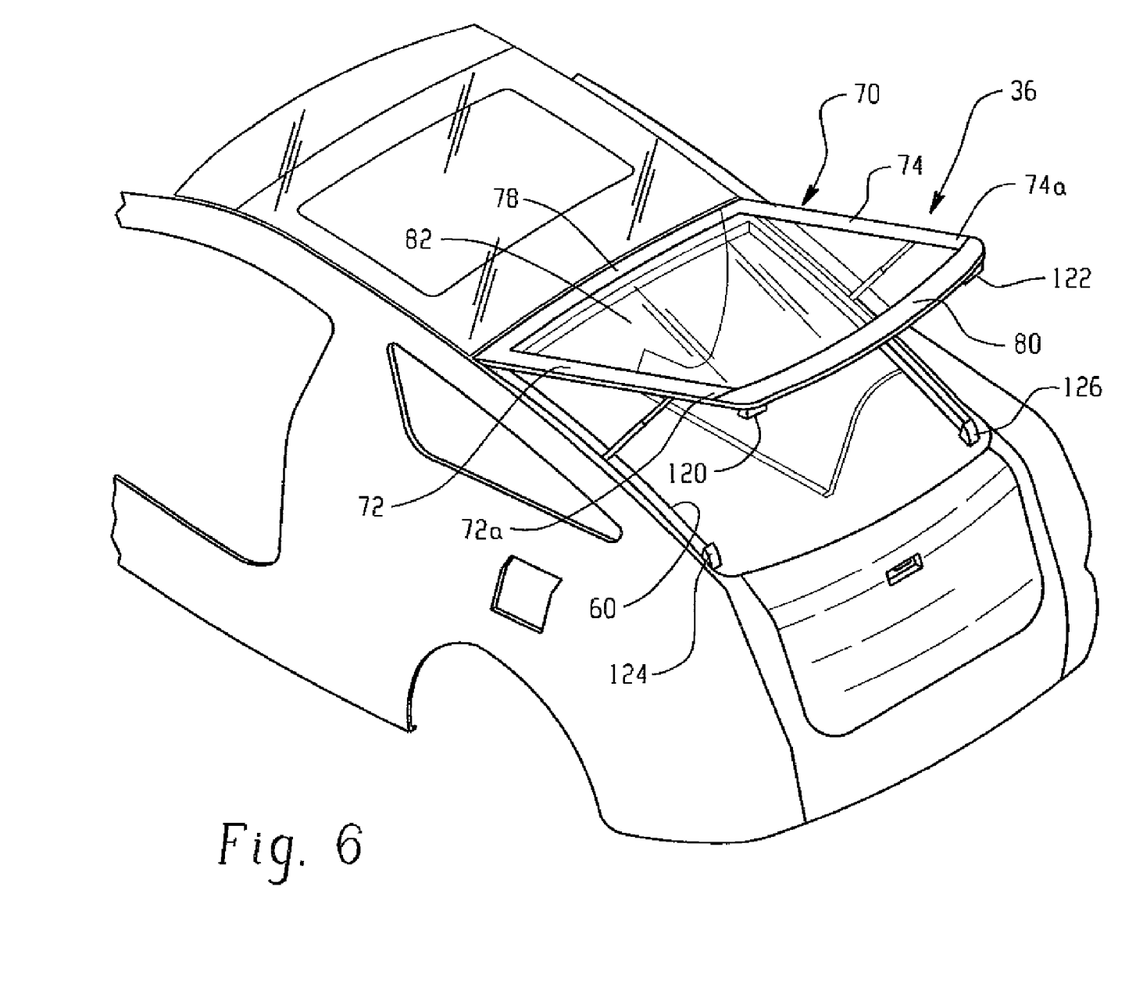
FIG. 6 is a schematic perspective view similar to FIG. 1, but showing the second closure in the pivot open position and schematically illustrating latches and strikers for the second closure.

With additional reference to FIG. 6, one of a striker or a latch can be disposed on the hatch closure 36 adjacent a lower end thereof and the other of the striker or latch can be disposed on the hatch frame 60 adjacent a lower end thereof so that the latch can selectively latch onto the striker for latching the hatch closure 36 in its pivot closed position. In the illustrated embodiment, the lateral side members 72, 74 of the flip frame 70 each include latches 120, 122 adjacent lower ends 72a, 74a of the lateral side members 72, 74 that selectively latch onto corresponding strikers 124, 126 mounted on the hatch frame 60. The latches 120, 122 latch onto respective strikers 124, 126 when the hatch closure 36 is moved to its pivot closed position. Powered actuators 120a, 122a can be operatively connected, respectively, to each latch 120, 122 for powered operation and/or locking of the latch. Operation of the latches and actuators is generally known and understood by those skilled in the art and therefore is not described in further detail herein.

Figure 7:
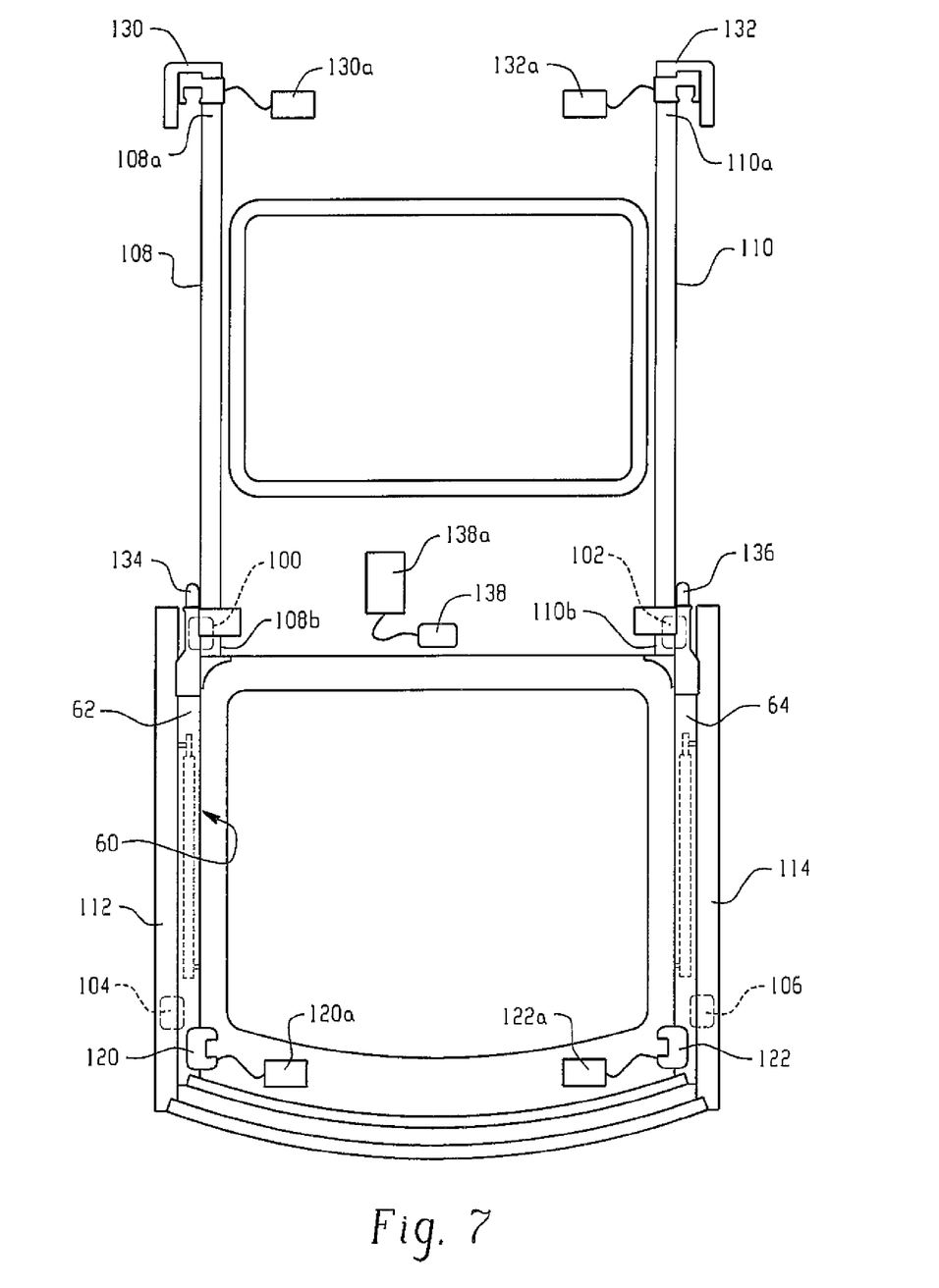
FIG. 7 is another schematic plan view schematically illustrating the locations for latches and strikers for the first closure.
Figure 8:
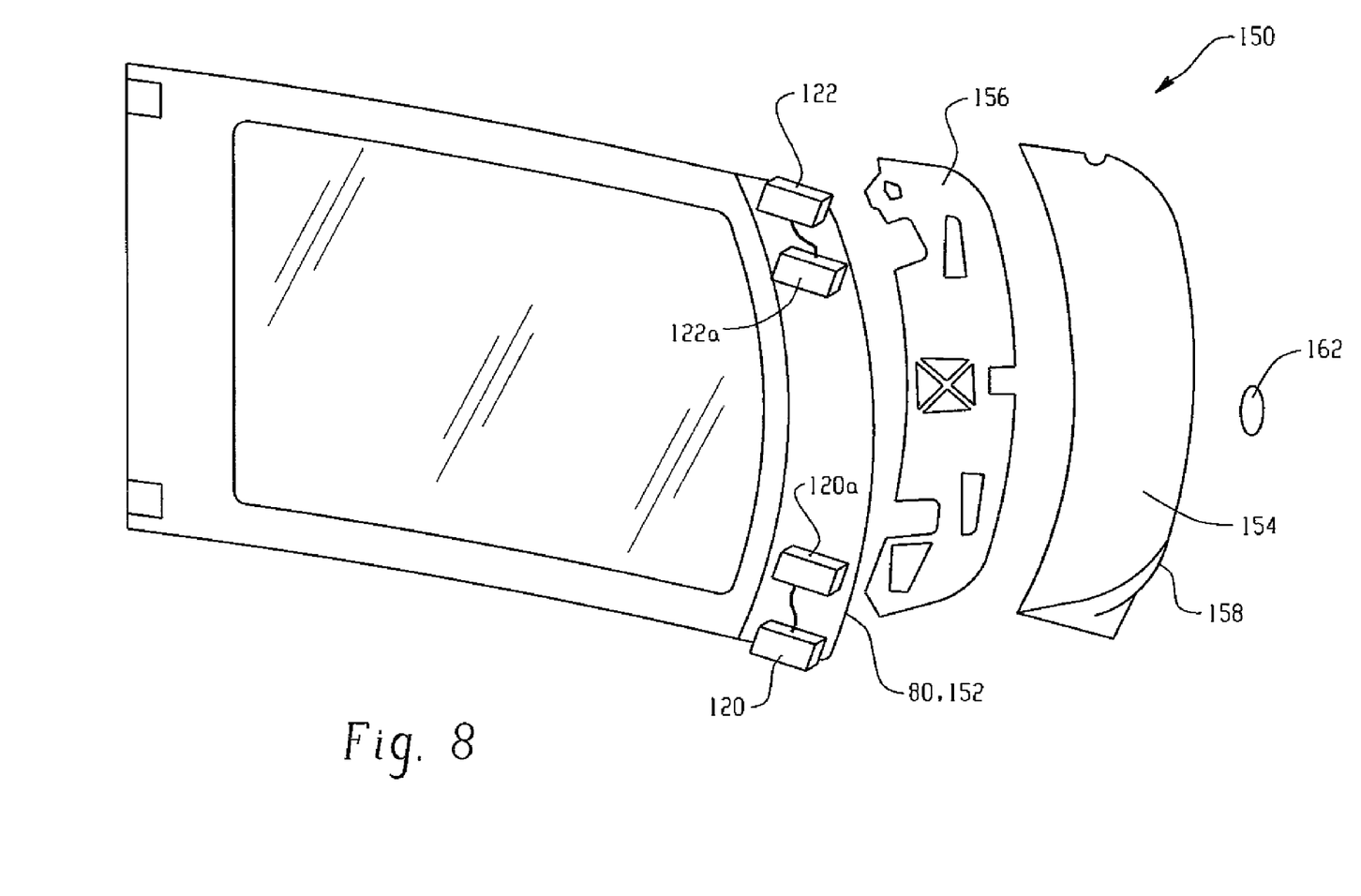
FIG. 8 is an exploded perspective view of a spoiler assembly for the second closure.
Figure 9:
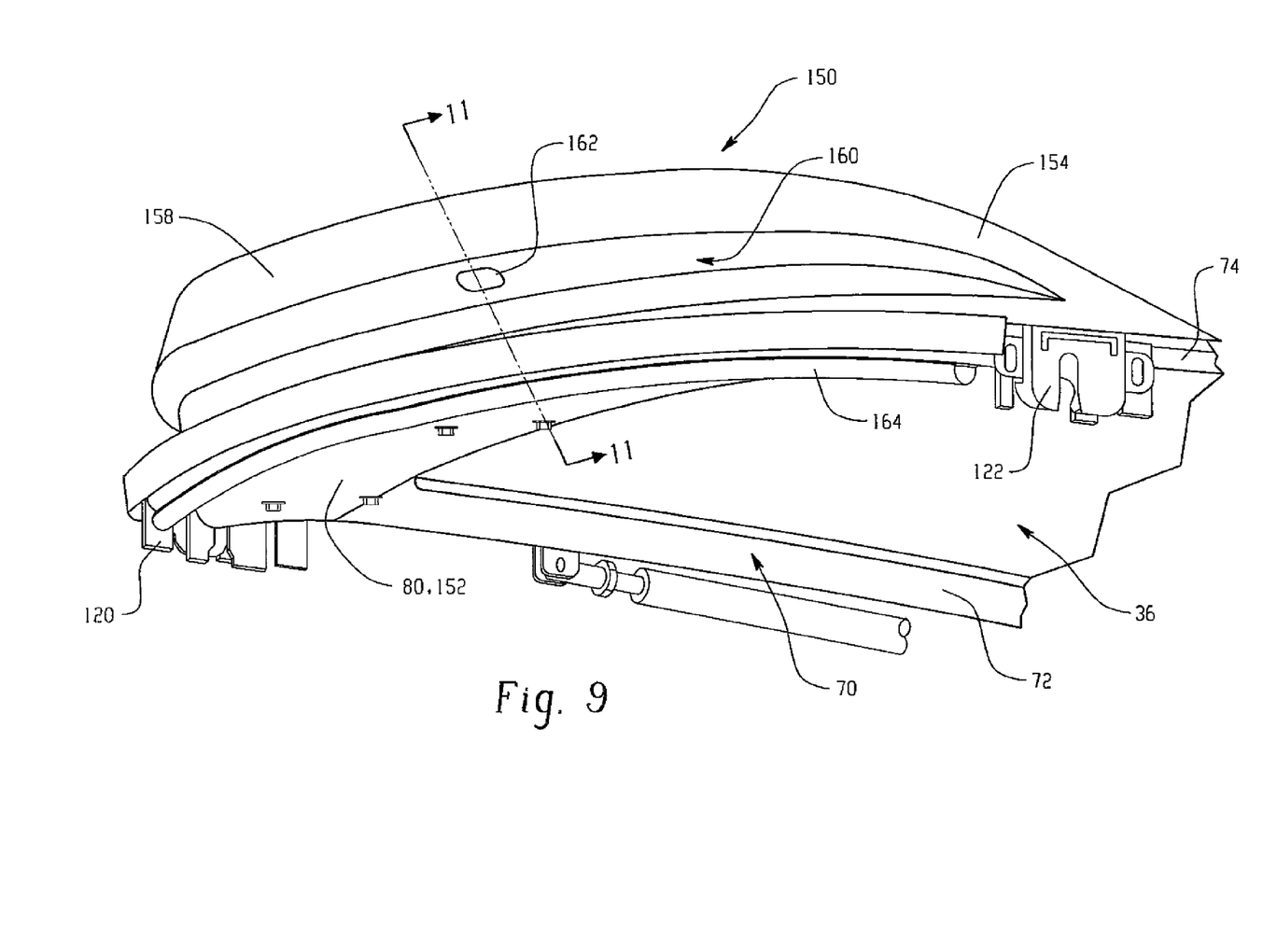
FIG. 9 is a partial rear perspective view of the first closure showing an underside of the spoiler assembly.
Figure 10:
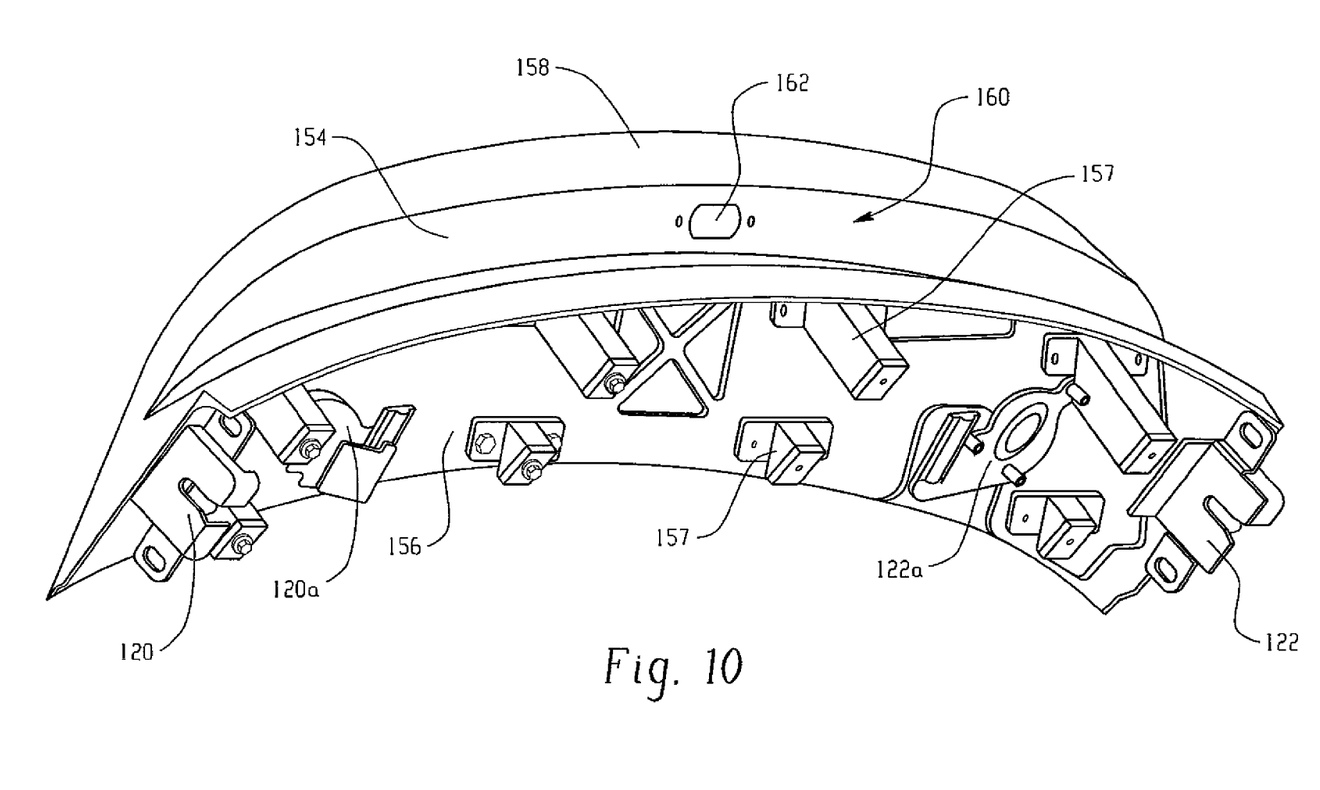
FIG. 10 is an underside perspective view of a frame and shell member of the spoiler assembly shown removed from the first closure.
Figure 11:
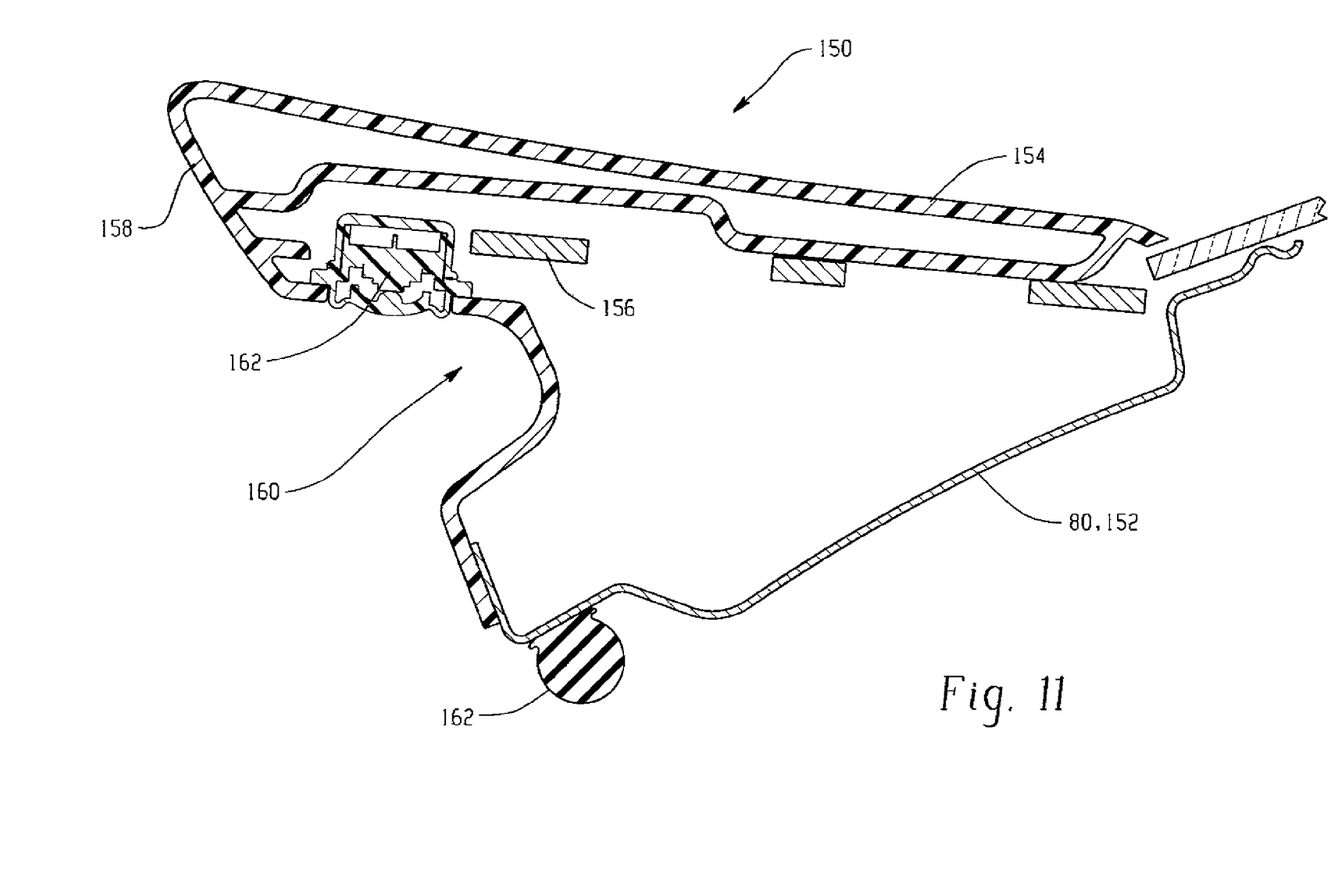
FIG. 11 is a sectional view of the spoiler assembly taken along the line 11-11 of FIG. 9.

With additional reference to FIG. 7, one of a striker or latch can also be disposed on the hatch frame 60 and the other of the striker or latch disposed on the vehicle body 20, wherein this latch selectively latches onto the striker for latching the slide frame in its closed position. More particularly, in the illustrated embodiment, latches 130, 132 are mounted at forward ends 108a, 110a of the front tracks 108, 110 and strikers 134, 136 are mounted to the hatch frame 60 at the upper ends 62a, 64a of the side frame members 62, 64. The latches 130, 132 latch onto the strikers 134, 136 when the slide frame 60 is moved to the slide open position to latch the slide frame 60 in the slide open position. Another latch 138 can be mounted on the vehicle body 20 (mounting not shown) between the front rails 108, 110 longitudinally adjacent rear ends 108b, 110b of the rails 108, 110. The latch 138 can selectively latch onto a striker (not shown) mounted on the hatch frame 60. Powered actuators 130a, 132a, 138a can be operatively connected, respectively, to each latch 134, 136, 138 for powered operation and/or locking of the latch. Again, operation of the latches and actuators is generally known and understood by those skilled in the art and therefore is not described in further detail herein.

With additional reference to FIGS. 8-11, a spoiler assembly 150 is illustrated for the rear hatch closure assembly 16 (i.e., the rear hatch 16) on the vehicle 10. The spoiler assembly 150 includes a base member 152 extending laterally across the rear hatch 16, at least one latch (e.g., latches 120, 122) mounted to and/or above the base member 152 and a shell member 154 secured or mounted to the base member 152 over the at least one latch for concealing the at least one latch. The spoiler assembly 150 can also included at least one latch actuator (e.g., latch actuators 120a, 122a) mounted to and/or above the base member 152 and operatively connected to the at least one latch. Like the at least one latch, the at least one latch actuator can be covered and concealed by the shell member 154.

As shown, the base member 152 extends laterally across the rear hatch 16 and can be included as part of the second closure 36 that is pivotally mounted to the first closure 34, and particularly to the hatch frame 60 thereof that is slidably mounted to the vehicle body 20 of the vehicle 10. More particularly, the base member 152 can be the lower cross member 80 (FIG. 5) of the flip frame 70 that, together with the spaced apart lateral side members 72, 74 and the upper cross member 78, defines the window opening 76. A seal 162 can be disposed on an underside of the base member 152 for sealing against the tailgate 12, particularly the upper edge 12a thereof, when the closures 34, 36 and the tailgate 12 are in respective closed positions.

The spoiler assembly 150 can additionally include a rigid frame or frame member 156 interposed between the base member 152 and the shell member 154 for imparting strength to the shell member 154, particularly when operated as a handle as will be described in more detail below. In particular, the frame 156 can be mounted to the base member 152 with the shell member 154 supported by the frame 156. To impart strength to the shell member 154, the frame 156 can be formed of a rigid material, such as aluminum. Alternatively, the frame 156 could be formed of steel, high strength plastic or some other rigid material. The frame member 156 can include a plurality of tower structures 157 of varying heights for supporting the frame member 156 at the illustrated elevation relative to the base member 152.

The at least one latch can be the latches 120, 122 of the second closure, which can be disposed at opposite ends of the base member 152 for selectively latching the second closure 36 in the pivot closed position. More particularly, first latch 120 can be mounted to the frame member 156 (as shown) and/or the base member 152 adjacent a first lateral side or end of the base member 152 and second latch 122 can be mounted to the frame member 156 (as shown) and/or the base member 152 adjacent a second, opposite lateral side or end of the base member 152. The latches 120, 122 can selectively latch onto the strikers 124, 126 (FIG. 6) respectively mounted on the slidably mounted hatch frame 60 for latching the second closure 36 in the pivot closed position on the hatch frame 60. The actuators 120a, 122a can likewise be mounted to the frame member 156 (as shown) and/or to the base member 152 laterally inside relative to the latches 120, 122.

The shell member 154 can be formed of a plastic material, such as acrylonitrile butadiene styrene (ABS), though this is not required. Additionally, the shell member 154 can be configured (e.g., by molding) to operate as a handle for the closure assembly 16 (e.g., for opening the second closure 38 when the latches 120, 120 are unlatched from the strikers 124, 126 or for opening the first closure 36 when the latch 138 is unlatched from its striker). In the illustrated embodiment, the shell member 156 includes a fin or fin portion 158 that is configured as a handle for opening the closure assembly 16. In this regard, the fin portion 158 can be formed as a raised portion defining an underside recess 160 for an operator's hand to grasp the closure assembly 16 and manipulate it as desired (e.g., to slide the first closure 36 to the slide open position or to pivot the second closure 38 to the pivot open position). A release switch 162 can be disposed under the fin 158 of the shell member 154 where it is somewhat concealed, the release switch operatively connected to the latch actuators 120a, 122a and functioning in the illustrated embodiment as a button-type actuator member for the latch actuators 120a, 122a and/or the actuator 138a of the latch 138 (e.g., depression of the release switch 162 causes the latch actuators 120a, 122a to unlatch the latches 120, 122 from their respective strikers when a key fob is within a predefined distance of the vehicle 10).

Advantageously, the spoiler assembly 150 allows the latches 120, 122 and latch actuators 120a, 122a to be packaged in a tight area having spatial layout constraints. Also, through incorporation of the rigid frame member 156, the spoiler assembly 150 has the strength sufficient to be operated as a handle for the closures 136, 138 without becoming damaged (i.e., no durability issues). This further allows for an improved appearance for the vehicle 10 and/or improved aerodynamics for the vehicle 10.

In operation, the tailgate 12 and/or the rear hatch 16 can be opened for providing access through the rear cargo opening 18. For example, the sliding hatch 16 can be moved between the slide closed position of FIG. 1 and the slide open position of FIG. 3. Such opening can be facilitated by using the shell member 154 of the spoiler assembly 150 as a handle. When both the tailgate 12 is in the open position and the hatch 16 is in the slide open position, the vehicle 10 is transformed into a vehicle with truck-like cargo carrying capability, while the vehicle 10 can still remain as a coupe-type or other compact vehicle. Accordingly, in a coupe-type vehicle or other small vehicle, large cargo carrying capability is provided. The latches 130, 132 can latch onto the strikers 134, 136 for holding the first closure 34 in the slide open position and the latch 138 can latch onto the body mounted striker for holding the first closure in the slide closed position. Alternatively, when the slide hatch 16 is in the slide closed position, the hatch closure 62 can be moved or pivoted to the pivot open position as shown in FIG. 3 to provide access through the cargo opening 18, particularly through the hatch opening. The latches 120, 122 can latch onto the strikers 124, 126 for latching closed the hatch closure 36. The latches 120, 122 and/or latch 138 can be unlatched from their respective strikers by the latch actuators 120a, 122a, 138a when the release switch 160 is depressed.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A spoiler assembly for a rear hatch closure assembly on a vehicle, comprising:
   a base member extending laterally across the hatch closure assembly;
   a latch mounted to the base member; and
   a shell member secured to the base member to cover and conceal the latch, wherein the hatch closure assembly includes:
      a hatch frame slidably mounted to a vehicle body of the vehicle; and
      a hatch closure pivotally mounted to the hatch frame and including the base member extending laterally thereacross.

2. The spoiler assembly of claim 1 wherein the hatch closure includes a flip frame having spaced apart lateral side members defining a window opening therebetween and spaced apart cross members extending between the lateral side members to further define the window opening, the base member forming a lower one of the cross members.

3. The spoiler assembly of claim 2 wherein the latch selectively latches to a striker mounted on the hatch frame for latching the hatch closure in a pivot closed position on the hatch frame.

4. The spoiler assembly of claim 1 wherein the latch is a first latch mounted adjacent a first lateral side of the base member and the spoiler assembly further includes:
   a second latch mounted adjacent a second lateral side of the base member.

5. The spoiler assembly of claim 4 wherein the first latch selectively latches to a first striker disposed on the hatch frame and the second latch selectively latches to a second striker disposed on the hatch frame.

6. The spoiler assembly of claim 1 wherein the shell member is formed of acrylonitrile butadiene styrene (ABS).

7. The spoiler assembly of claim 1 further including:
   a rigid frame mounted to the base member with the shell member supported by the rigid frame, the rigid frame interposed between the base member and the shell member.

8. The spoiler assembly of claim 7 wherein the rigid frame is formed of aluminum.

9. The spoiler assembly of claim 1 wherein the shell member is configured to operate as a handle for the hatch closure assembly, and wherein the shell member includes a fin that is configured as a handle, the fin formed as a raised portion defining an underside recess for grasping the closure assembly.

10. A spoiler assembly for a rear hatch closure assembly on a vehicle, comprising:
    a base member extending laterally across the hatch closure assembly;
    a latch mounted to the base member;
    a shell member secured to the base member to cover and conceal the latch, and
    a latch actuator mounted to the base member and operatively connected to the latch, the latch actuator covered and concealed by the shell member.

11. A spoiler assembly for a rear hatch closure assembly on a vehicle, comprising:
    a base member extending laterally across the hatch closure assembly;
    a latch mounted to the base member;
    a shell member secured to the base member to cover and conceal the latch, and
    a release switch disposed under a fin of the shell member.

12. A spoiler assembly for a vehicle, comprising:
    a base member extending laterally across a hatch closure;
    a pair of latch members disposed at opposite ends of the base member for latching the hatch closure in a closed position;
    a shell member mounted over the pair of latch members onto the base member, the shell member including a fin configured as a handle, the fin formed as a raised portion defining an underside recess for grasping.

13. The spoiler assembly of claim 12 further including:
    a frame member interposed between the base member and the shell member for imparting strength to the shell member when operated as a handle for the hatch closure.

14. The spoiler assembly of claim 13 wherein the hatch closure is at least one of a sliding hatch closure or a pivoting hatch closure.

15. The spoiler assembly of claim 14 wherein the shell member is formed of an ABS plastic material.

16. The spoiler assembly of claim 12 further including:
    the hatch closure slidably mounted to a vehicle body of the vehicle; and
    a hatch closure pivotally mounted to the hatch frame and including the base member extending laterally thereacross.

17. The spoiler assembly of claim 16 further including:
    a latch actuator mounted to the base member and operatively connected to the latch, the latch actuator covered and concealed by the shell member.

18. A spoiler assembly for a sliding hatch closure, comprising:
   a base member formed as a cross member on a flip frame pivotally mounted on a slide frame of the sliding hatch closure;
   a latch mounted to the base member the latch selectively locking to a striker disposed on the slide frame for latching the flip frame in a pivot closed position; and
   a shell member mounted to the base member over the latch for concealing the latch.

19. The spoiler assembly of claim 18 further including a rigid frame member imparting strength to the shell member, the shell member including a handle portion.

* * * * *